Dec. 29, 1931.  H. C. EDDY  1,838,376
TREATER HAVING CENTRIFUGAL DRY OIL CIRCULATION
Original Filed Dec. 19, 1927

INVENTOR:
Harold C. Eddy,
BY
ATTORNEY.

Patented Dec. 29, 1931

1,838,376

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

TREATER HAVING CENTRIFUGAL DRY OIL CIRCULATION

Application filed December 19, 1927, Serial No. 241,099. Renewed November 10, 1930.

This invention relates to the electrical treatment of fluids, and in the present embodiment consists of an electrical treater and method designed for treating emulsions. It will be apparent from the following description of the invention that my invention may be used for treating various fluids or mixtures which will be acted upon by an electric field; therefore, I do not intend to limit myself by the embodiment of the invention presented herein.

In order that the advantages of the invention may be understood, a brief description of the present apparatus for treating petroleum emulsions will be described. The ordinary equipment consists of a tank in which an electrode is suspended and between which tank and electrode an electric field is established. The fluid to be treated, which is in this case emulsion, is passed through the electric field. The water particles are acted upon so that they form into masses of sufficient size to gravitate from the oil. There is a tendency for the coalesced water particles to chain up between the tank and the electrode, thus causing short-circuiting which impairs the operation of the treater. It has been found that this chaining-up action may be prevented by establishing a dielectric barrier in the electric field so that it is impossible for the water particles to completely chain the gap between the tank and the electrode. In treaters with which the inventor is familiar, which utilize a dielectric barrier, the efficiency of the electrical treater is reduced due to the dielectric barrier flowing from proper position in the electric field and crowding out the emulsion or fluid to be treated.

It is an object of this invention to provide an electrical treater and method in which the dielectric barrier employed will remain in proper position in the electric field.

I overcome the disadvantages of the barrier crowding out the fluid to be treated by circumferentially circulating the dielectric barrier along the surface of one of the electrodes and preferably along the inner surface of the tank.

Other objects and advantages of the invention will be made apparent in the following description. The invention may be best understood by referring to the accompanying drawings in which.

Figure 1:
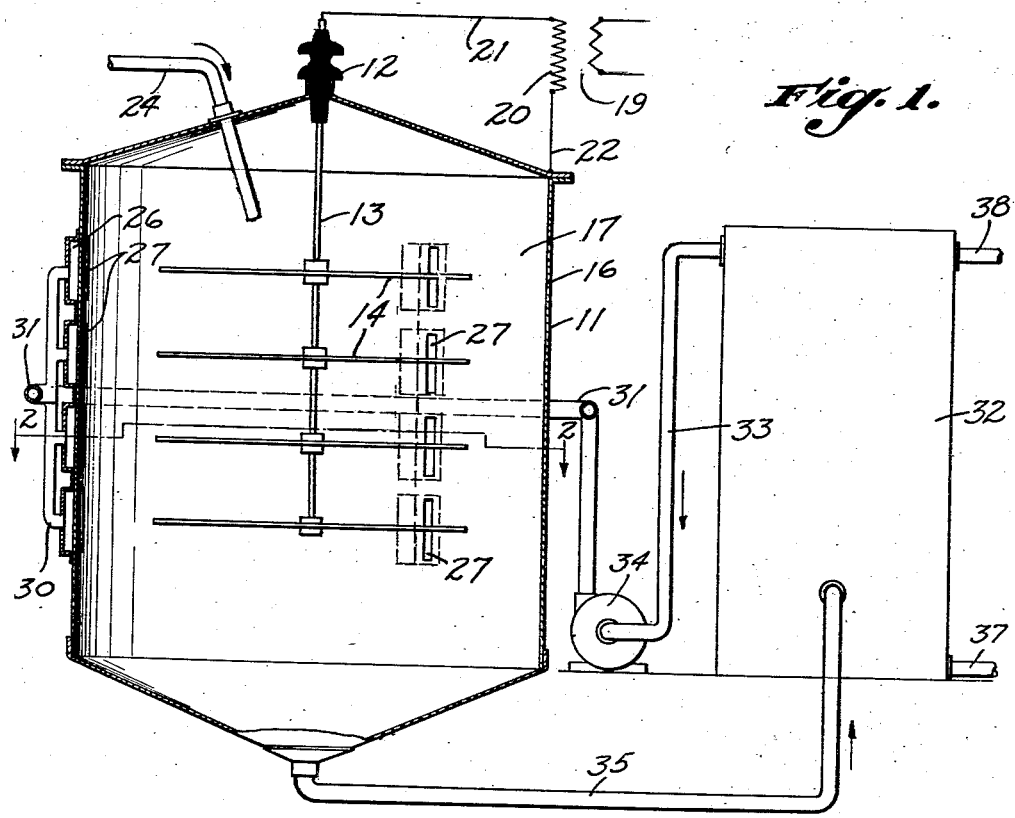
Fig. 1 is an elevational view partly sectioned.

Referring to the drawings in detail, the numeral 11 is a tank which serves as an outer electrode. In the top of the tank 11 is an insulator 12 through which a rod 13 extends to the inside of the tank 11. The rod 13 supports a plurality of plates 14 which serve as an inner electrode for the invention. Between the plates 14 and the cylindrical wall 16 of the tank 11 is a treating space 17. An electrical field is established in the treating space 17 by means of a transformer 19, the secondary 20 of which is connected to the rod 13 by a conductor 21 and to the tank 11 by a conductor 22. Emulsion or other fluid to be treated is introduced to the interior of the tank 11 by means of an inlet pipe 24. This particular method of introducing the emulsion, by impinging a stream thereof on the electrode 14, is not per se a part of the present invention, but is broadly claimed in certain co-pending applications.

The dielectric barrier supply means of the invention is provided in the form of nozzles 26 which are circumferentially spaced around the cylindrical wall 16 of the tank 11. These nozzles 26 are communicated to the interior of the tank 11 and to the outer annular part of the treating space 17 by means of openings 27 formed in the tank 11. The nozzles 26 coact with the openings 27 so that the dielectric barrier, which is in this use of the invention a fluid, is directed tangentially into the treating space 17 substantially as indicated by arrows 28. The motion thus given to the dielectric barrier causes it to flow circumferentially in the treating space 17 adjacent to the inner surface of the cylindrical wall 16 of the tank 11.

Figure 2:
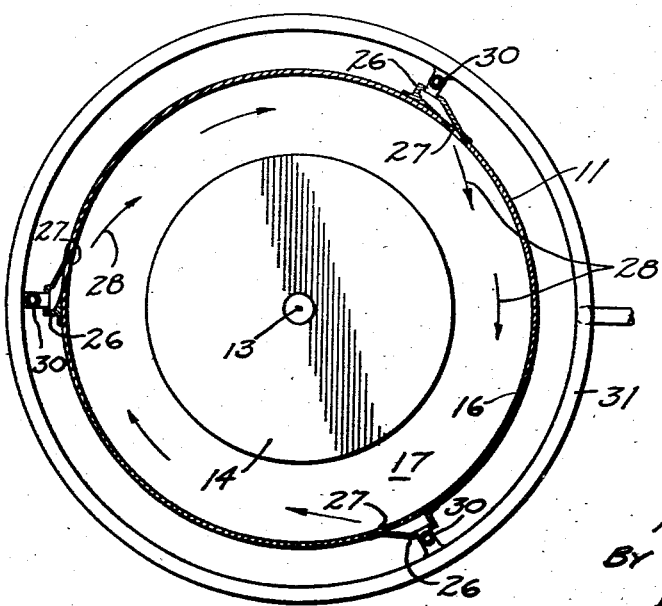
Fig. 2 is a section taken on the line 2—2 of Fig. 1.

As shown in Fig. 2, at intervals around the circumference of the tank 11 a plurality of nozzles 26 may be arranged in vertical alignment. The nozzles 26 are supplied with a dielectric barrier by means of pipes 30 which are connected to a manifold pipe 31. The manifold pipe 31 is connected to a settling tank 32 by means of a pipe 33 which includes a pump 34. Connected to the lower part of the tank 11 is a treated fluid pipe 35 which is connected to the lower part of the settling tank 32. Water is withdrawn from the settling tank 32 by a pipe 37, and dry oil is withdrawn by a pipe 38.

The operation of the invention is substantially as follows:

In starting up the apparatus, it is preferable to have the tank 11 filled with a dielectric barrier. In the present invention the dielectric barrier may most conveniently be a treated oil which does not have sufficient conducting liquid therein to permit short-circuiting. The transformer 19 is energized and an electric field is set up between the plates 14 and the tank 11. The fluid to be treated is introduced through the pipe 24 and flows downward through the treating space 17. When fluid to be treated is supplied to the tank 11 the pump 34 is set into operation so that the dielectric barrier is caused to circulate in the treating space 17. As previously explained, the nozzles 26 direct the dielectric barrier so that it is circumferentially circulated in the treating space 17 adjacent to the inner surface of the cylindrical wall 16 of the tank 11. The fluid to be treated passes downward through the inner part of the treating space 17, being subjected therein to the action of an electric field. It is impossible for any of the water particles to cause a short-circuiting of the apparatus due to the fact that the dielectric barrier adjacent to the tank 11 prevents the water particles from completely gapping the treating space. The treated emulsion passes through the pipe 35 to the settling tank 32 where the water and oil separate by gravity, the dry oil passing to the upper part of the tank 32. This dry oil is delivered to a storage tank by the pipe 38, but a small portion is taken through the pipe 33 by the pump 34 and caused to flow through the nozzles 26 so that a part of the dry oil serves as a dielectric barrier.

The important part of the invention is circumferentially circulating the dielectric barrier in the treating space 17. It is found that by this manner of circulating, the passage of the fluid to be treated through the treating space will not be interfered with and the capacity of the apparatus will not be reduced to an undersirable efficiency.

As pointed out in the first part of this specification, I have no intention of limiting my invention to the particular embodiment or use shown herein. The invention in its broad conception consists of a treater regardless of the type of fluid which it treats. This treater consists of at least two electrodes between which an electric field is established and means for circumferentially circulating a dielectric barrier of suitable characteristics in the treating space.

This invention is an improvement on an invention of Harmon F. Fisher, filed September 16, 1926, Serial No. 135,804, wherein certain features disclosed in the instant application are broadly claimed.

I claim as my invention:

1. An electrical treater comprising: a primary electrode; a secondary electrode; means for establishing an electrical field between said electrodes; means for passing a fluid to be treated into said electrical field; and means for circumferentially circulating a dielectric barrier in said electrical field adjacent to one of said electrodes.

2. A combination as defined in claim 1 in which said primary electrode surrounds said secondary electrode, and said dielectric barrier is circulated adjacent to said primary electrode.

3. An electrical treater comprising: a tank; said tank acting as an outer electrode; an inner electrode in said tank; means for establishing an electrical field between said electrodes; means for introducing a fluid to be treated into said electrical field; and a nozzle for circumferentially circulating a dielectric barrier in said tank in an annular area adjacent to the wall of said tank.

4. An electrical treater comprising: a tank; said tank acting as an outer electrode; an inner electrode in said tank; means for establishing an electrical field between said electrodes; means for introducing a fluid to be treated into said electrical field; and a plurality of nozzles placed in different positions around the circumference of said tank for circumferentially circulating a dielectric barrier in said tank in an annular area adjacent to the wall of said tank.

5. In an electric treater, the combination of: a central electrode; a surrounding electrode, there being a treating space between said electrodes; and means for introducing a dielectric barrier tangentially into said treating space during treatment of a fluid therein.

6. In an electric treater, the combination of: concentric inner and outer electrodes defining an annular treating space therebetween; nozzle means directed tangentially into said treating space, said nozzles directing fluid into the outer part of said annular treating space immediately inside said outer electrode; means for supplying a dielectric medium to said nozzle means; and means for supplying an emulsion into said treating space.

7. A combination as defined in claim 6 in which said nozzle means comprises a plurality of nozzles associated with said outer electrode and spaced therearound and at different elevations whereby a uniform circulation of said dielectric medium takes place throughout the length of said treating space.

8. A method of treating a fluid by the use of an annular electric field formed between inner and outer electrodes, which method includes the steps of circumferentially circulating a dielectric medium in the most extended portion of said electric field and immediately inside said outer electrode, and introducing the fluid to be treated into that portion of said electric field between said central electrode and said circumferentially circulating dielectric medium.

9. A method of treating a fluid which includes the steps of, setting up an electric field between a pair of electrodes, subjecting said fluid to the action of said electric field, and introducing a stream of dielectric medium tangentially into said field adjacent one of said electrodes.

In testimony whereof, I have hereunto set my hand at Los Angeles, California, this 12th day of December, 1927.

HAROLD C. EDDY.